Dec. 11, 1934.  P. BÖTTCHER  1,983,896
HIGH SPEED DOUBLE ROTOR MOTOR
Filed Oct. 8, 1931
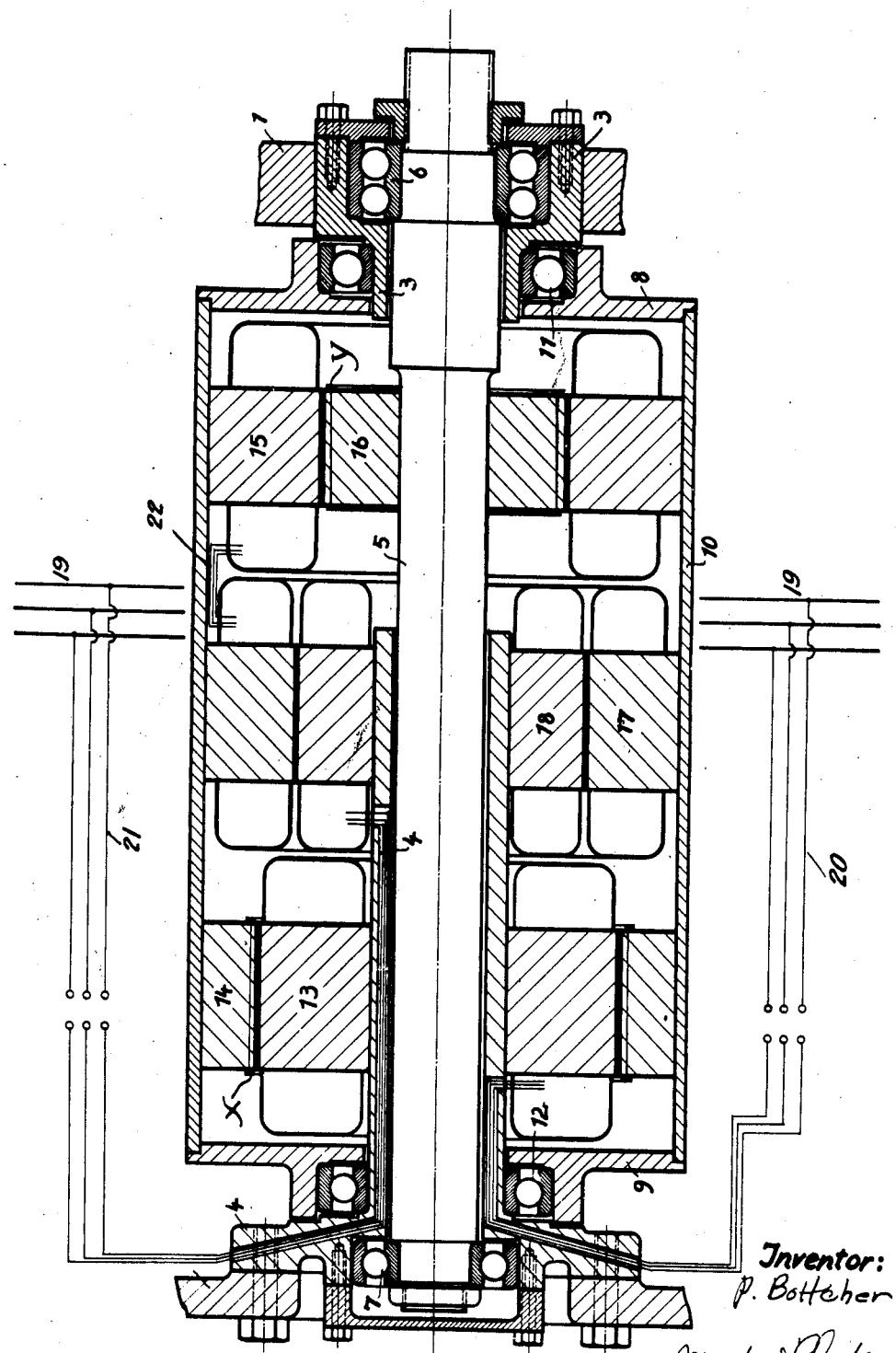
Inventor:
P. Böttcher
By Marks & Clerk
Attys.

Patented Dec. 11, 1934

1,983,896

UNITED STATES PATENT OFFICE 1,983,896

HIGH SPEED DOUBLE-ROTOR MOTOR

Paul Böttcher, Altona-Bahrenfeld, near Hamburg, Germany

Application October 8, 1931, Serial No. 567,688
In Germany October 25, 1930

1 Claim. (Cl. 172—280)

An ordinary three phase electric motor can, if necessary, that is to say, if constructed with only one pair of poles, attain a speed of rotation equivalent to the periodicity of the supply current network employed. As for some purposes, practical needs demand still higher speeds, various types of double-rotor dynamo electric machines have been constructed. All known types of these machine constructions have one feature in common, namely, the placing one inside the other or side by side of two separate electric motors in such a way that their speeds are added together with respect to the shaft to be driven.

For this purpose, an intermediate rotor is placed between the stationary part of the electric motor and the shaft to be driven, this rotor forming with the stationary part as well as with the shaft, an independent automatic electric motor. It is a matter of no importance whether the intermediate rotor acts on both sides as stator and on both sides as rotor or on one side as stator and on one side as rotor and accordingly it is of no importance whether the stationary part and the part on the rapidly rotating shaft is provided as stator or as rotor.

As in every case such machines are provided with two rotating parts, it is essential, even where a motor with a short-circuited or squirrel cage secondary is used, to supply at least one of these rotating parts with driving current from the network or main through slip rings. As compared with simple motors with a short circuited or squirrel cage secondary—which are becoming increasingly important on small machines, because of their simplicity—all known types of double rotor motors have every known disadvantage connected with slip rings.

The present invention relates to a double rotor induction motor having two sets of co-operating exciting and working windings in which slip rings for supplying current to one of the rotating parts are eliminated, the current being supplied to the rotating part, by inductive action of a stationary magnetic field provided for the purpose. Similarly to the known types of period or frequency converters, the rotating part is provided with a separate armature winding which rotates in a stationary magnetic field maintained by current from the network or main. As a result, an electric current of correspondingly higher periodicity is induced, precisely as in a period or frequency converter, and this current is utilized directly to drive the second unit. The second unit is thus supplied with current from the main or network indirectly through the period or frequency converter by induction instead of through slip rings. Thus with this machine, the speed desired is obtained by combined action resulting from the use of a double rotor and a period or frequency converter. As the period or frequency conversion can be effected within any desired limits by choosing the correct conditions, such a motor is not limited with respect to the speed attainable in the upper ranges, as is the case with the known types of double rotors provided with slip rings.

One form of motor constructed according to the invention is illustrated diagrammatically in section by way of example, by the accompanying drawing.

In the example illustrated, the motor frame is provided with two fixed open bearings 1 and 2, to which are secured two fixed bushings 3 and 4. The high speed driving shaft 5 of the motor is mounted in the bushings 3 and 4 by means of ball bearings 6 and 7. An intermediate rotor, comprising the flanges 8 and 9 and the casing 10, is mounted on the bushings 3 and 4 by means of ball bearings 11 and 12. The bushing 4 carries the primary member 13 of the first electric motor unit, said member 13 in the example illustrated, forming an internal stator. Current from the network or main 19 is supplied by a line 20 to the internal stator 13 in the same manner as in an ordinary motor with a short-circuited or squirrel cage winding $x$. The secondary member in the example illustrated formed by a rotor 14 is fitted in the intermediate rotor casing 10 and co-operates with the stator 13. Thus, the stator 13 with the rotor 14 constitutes the first electric motor unit, the casing 10 of the intermediate rotor representing the driven part as in motors provided with external rotors. The intermediate rotor casing 10 also carries an ordinary primary member 15. This primary member 15 co-operates with a secondary member 16 secured directly to the driving shaft 5. The squirrel cage winding is designated at $y$.

To enable current to be supplied to the primary member 15 without the use of slip rings, a period or frequency transformer is provided having a primary member fed from the main and a secondary member cooperating with the primary motor member 15. In the example illustrated, the secondary transformer member is a wire pack 17 provided in the casing 10 of the intermediate rotor, this pack 17 co-operating with a stationary field magnet 18 secured to the bushing 4. The primary transformer member is formed by a field magnet 18 fed from the network or main 19 by a line 21, in the same way as that for the stationary field magnet of a period or frequency converter, and there is, therefore, induced in the armature 17 (while it is rotating with the casing 10), a current having a correspondingly higher periodicity or frequency. The parts 17 and 18, therefore, form, purely electrically, nothing more than a period or frequency transformer of the known type. The induced current is not then drawn from the armature 17 of the period converter through slip rings, but is supplied by a line 22 directly to the primary member 15 of the second electric motor unit provided on the same casing 10 of the intermediate rotor. The second electric motor unit, comprising the parts 15 and 16, therefore, rotates at a speed which corresponds to the periodicity of the secondary current induced in the parts 17 and 18.

Such motors may be constructed in very many different ways, and thus it is of no consequence whether, for example, the stationary parts 13 and 18 are in the form of internal stators as shown, or of external stators.

It is a matter of no importance whatever whether the rotating parts are employed to serve the purpose of stator or rotor. The three electrical sets disposed side by side in the example illustrated may equally well be one within the other similarly to boxes, or they may be provided in part one inside the other or in part side by side without in any way affecting the electrical effect.

The only matter of importance with respect to the invention is that in a double rotor motor, one of the rotating parts is fed, by inductive action in a period converter, with the necessary current from the network or main, thereby entirely eliminating slip rings. Thus, only the first motor is fed electrically with current direct from the network or main, whereas the second is driven by the secondary current generated in the period converter and having a correspondingly different periodicity and voltage.

I claim:

In a double rotor dynamo electrical machine the combination of a first motor unit, a frequency transformer and a second motor unit, each of said motor units and said transformer including a primary member and a secondary member, the primary members of said first motor unit and of said transformer being mounted stationary, means for supplying polyphase currents to said stationary primary members connected in parallel, an intermediate rotor including the secondary members of said first motor unit and of said transformer and the primary member of said second motor unit, means for supplying the currents induced in the secondary member of said transformer to the primary member of said second motor unit, the secondary member of which is mounted on the shaft to be driven.

PAUL BÖTTCHER.